(12) United States Patent
Moon

(10) Patent No.: US 11,740,813 B2
(45) Date of Patent: Aug. 29, 2023

(54) MEMORY SYSTEM FOR PROCESSING A DELEGATED TASK AND AN OPERATION METHOD THEREOF

(71) Applicant: SK hynix Inc., Gyeonggi-do (KR)

(72) Inventor: Su Won Moon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 143 days.

(21) Appl. No.: 17/144,478

(22) Filed: Jan. 8, 2021

(65) Prior Publication Data

US 2021/0382641 A1 Dec. 9, 2021

(30) Foreign Application Priority Data

Jun. 4, 2020 (KR) ........................ 10-2020-0067597

(51) Int. Cl.
*G06F 3/12* (2006.01)
*G06F 3/06* (2006.01)

(52) U.S. Cl.
CPC .......... *G06F 3/0634* (2013.01); *G06F 3/0607* (2013.01); *G06F 3/0659* (2013.01); *G06F 3/0679* (2013.01)

(58) Field of Classification Search
CPC ...... G06F 3/0607; G06F 3/061; G06F 3/0634; G06F 3/0659; G06F 3/0679
See application file for complete search history.

(56) References Cited

U.S. PATENT DOCUMENTS 9,841,911 B2 12/2017 Yu et al.
9,927,902 B2 3/2018 Burr et al.
2006/0136495 A1\* 6/2006 Schaad ................. G06Q 10/06
2018/0181183 A1\* 6/2018 Yoon ..................... G06F 1/3228
2019/0332165 A1 10/2019 Stenfort \* cited by examiner

*Primary Examiner* — Yong J Choe
(74) *Attorney, Agent, or Firm* — IP & T Group LLP

(57) ABSTRACT

A memory system including a non-volatile memory device storing data; and a controller configured to receive a request for an input/output operation regarding the data from a host processor to perform the input/output operation. After receiving a delegated task which is distinguished from the input/output operation, the controller is further configured to perform the delegated task independently and store a result of the delegated task in the non-volatile memory device.

18 Claims, 9 Drawing Sheets

MEMORY SYSTEM FOR PROCESSING A DELEGATED TASK AND AN OPERATION METHOD THEREOF

CROSS-REFERENCE TO RELATED APPLICATION

This patent application claims priority to Korean Patent Application No. 10-2020-0067597, filed on Jun. 4, 2020, the entire disclosure of which is incorporated herein by reference.

TECHNICAL FIELD

The disclosure relates to a memory system and a data processing system including the memory system, and more specifically, an apparatus and a method for delegating a task from a host to a memory system.

BACKGROUND

Recently, a paradigm for a computing environment has shifted to ubiquitous computing, which enables computer systems to be accessed anytime and everywhere. As a result, the use of portable electronic devices, such as mobile phones, digital cameras, laptop/notebook computers, and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), and has high data access speed and low power consumption. In the context of a memory system having such advantages, an exemplary data storage device includes a Universal Serial Bus (USB) memory device, a memory card having various interfaces, a solid state drive (SSD), or the like.

BRIEF DESCRIPTION OF THE DRAWINGS

The description herein makes reference to the accompanying drawings wherein like reference numerals refer to like parts throughout the figures.

DETAILED DESCRIPTION

Figure 1:
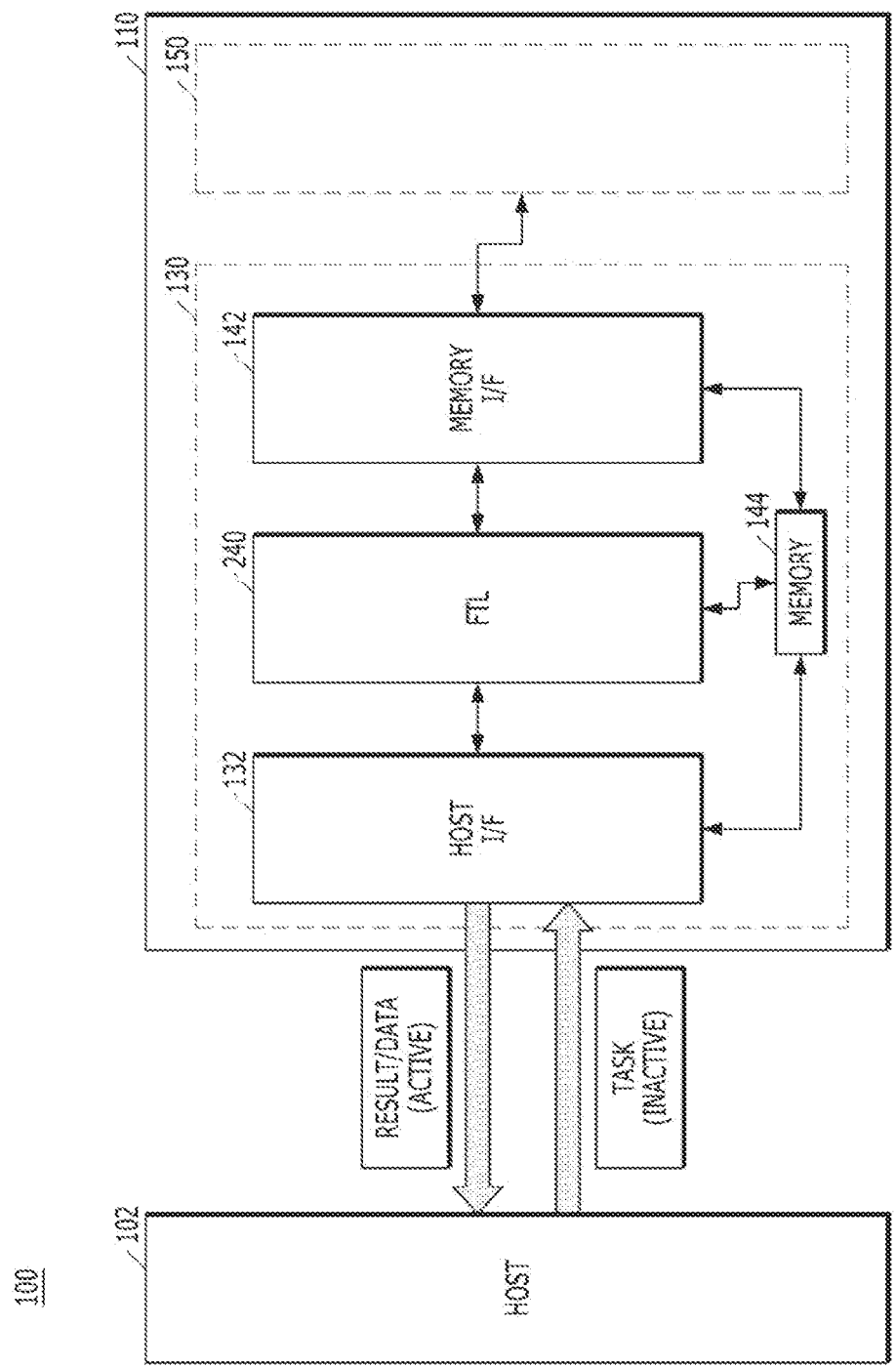
FIG. 1 illustrates a data processing system according to an embodiment of the disclosure.

Various embodiments of the disclosure are described below with reference to the accompanying drawings. Elements and features of the disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features that are included in one or more embodiments of the present disclosure, may be combined in other embodiments of the present disclosure.

In this disclosure, the terms "comprise," "comprising," "include," and "including" are open-ended. As used herein, these terms specify the presence of the stated elements/components and do not preclude the presence or addition of one or more other elements/components.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the unit/circuit/component can be said to be configured to perform the task even when the specified blocks/unit/circuit/component is not currently operational (e.g., is not on). The blocks/units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in the disclosure, the term 'circuitry' refers to any and all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

As used herein, these terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

An embodiment of the disclosure can provide a data process system and a method for operating the data processing system, which includes components and resources such as a memory system and a host and is capable of dynamically allocating plural data paths used for data communication between the components based on usages of the components and the resources.

According to an embodiment of the disclosure, a host included in a data processing system may delegate a task to a memory system. The host can delegate the task to the memory system, and the memory system can independently perform the delegated task on behalf of the host and store an executed result regarding the delegated task. The memory system consuming less resources than the host can perform the delegated task so that operation efficiency of the data processing system can be improved.

Further, according to an embodiment of the disclosure, a host in a data processing system may utilize a memory system to support distributed processing. When tasks assigned to the host are accumulated and processing of at least some tasks is delayed in the host, the host can delegate some tasks to a memory system which operates with few workloads. This procedure can improve operation performance of the data processing system.

In an embodiment, a memory system can include a non-volatile memory device storing data; and a controller configured to receive a request for an input/output operation regarding the data from a host processor to perform the input/output operation. After receiving a delegated task which is distinguished from the input/output operation, the controller can be further configured to perform the delegated task independently and store a result of the delegated task in the non-volatile memory device.

The controller can be further configured to receive a notification regarding an idle state, a power saving mode, or a hibernation mode from the host processor before performing the delegated task independently.

The delegated task can include an executable program code and data required to execute the executable program code. The controller can be configured to perform the delegated task independently without any assistance from the host processor and store the result of executing the delegated task in the non-volatile memory device.

The controller can be further configured to receive the delegated task delivered in a form of executable batch file.

The controller can be configured to perform the delegated task by fetching at least one command included in the delegated task, decoding the at least one fetched command, and store the result of executing the at least one fetched command.

The controller can be further configured to receive a command list from the host processor, the command list used for decoding the at least one command.

The controller can be further configured to receive control authority of a platform controller hub (PCH) from the host processor in order to perform the delegated task.

The data stored in the non-volatile memory device can include a user data item and a meta data item, and the delegated task can include a process for adjusting or generating the user data item or storing the user data item input from an external device. Herein, an item of data or a data item may be a sequence of bits. For example, the data item may include the contents of a file, a portion of the file, a page in memory, an object in an object-oriented program, a digital message, a digital scanned image, a part of a video or audio signal, or any other entity which can be represented by a sequence of bits. According to an embodiment, the data item may include a discrete object.

In another embodiment, a method for operating a memory system can include receiving a delegated task from a host processor; receiving a notification of an idle state or a power saving mode from the host processor; performing a delegated task independently; and storing a result of the delegated task in a non-volatile memory device.

The method can further include checking whether the host processor wakes up; checking whether a log includes information regarding the result of the delegated task; and transmitting the result of the delegated task to the host processor when the log includes the information.

The delegated task can include an executable program code and data required to execute the executable program code, and the controller can be configured to perform the delegated task independently without any assistance from the host processor and store the result of executing the delegated task in the non-volatile memory device.

The delegated task can be in a form of executable batch file.

The performing the delegated task independently can include fetching at least one command included in the delegated task; and decoding the at least one fetched command.

The method can further include receiving a command list from the host processor, the command list used for decoding the at least one command.

The method can further include receiving control authority of a platform controller hub (PCH) from the host processor; and transmitting a request corresponding to the delegated task to the platform controller hub.

The data stored in the non-volatile memory device can include a user data item and a meta data item, and the delegated task can include a process for adjusting or generating the user data item or storing the user data item input from an external device.

In another embodiment, a method for operating a host processor coupled to a memory system including a non-volatile memory device and a controller to handle a user's request can include selecting an application program periodically executed among a list of currently executed application programs; configuring the application program periodically executed as a task to delegate the task to the memory system; and transmitting the task to the memory system.

The method can further include checking whether there is no user's request for a preset time; and notifying the memory system of an idle state, power saving mode, or hibernation mode based on a result of the checking, after transmitting the task to the memory system.

The method can further include generating the delegated task in a form of executable batch file, the delegated task including an executable program code and data required to execute the executable program code.

The method can further include transmitting a command list from the host processor, the command list used for decoding at least one command included in the delegated task.

In another embodiment, an operating method of a data processing system can include configuring, by a host, a task from a program to be executed by the host; delegating, by the host, the task to a controller; independently executing, by the controller, the delegated task to store one or more results of the executed task in a nonvolatile memory device; and providing, by the controller, the results to the host. The controller executes the delegated task by loading, onto an operating memory included in the controller, an operating system and one or more user programs that are installed in the nonvolatile memory device.

Embodiments of the disclosure are described below with reference to the accompanying drawings, wherein like reference numbers refer to like elements.

FIG. 1 illustrates a data processing system according to an embodiment of the disclosure.

Referring to FIG. 1, a data processing system 100 may include a memory system 110 and a host 102. The memory system 110 and the host 102 may be coupled with each other to transmit and receive data, commands, control signals, and the like.

The host 102 may be configured in various ways. For example, in a network environment, the host 102 may include a computing device capable of interactive communication with other computers through a network. The host 102 may have a specific host number. The host 102 may include a computing device that is identified and distinguished through a unique IP address configured by combining a host number and a network number to which the host 102 is connected. A computing device that uses the Point-to-Point Protocol (PPP) to access an Internet service provider can have a changeable unique IP address. The changeable unique IP address can be kept only while being connected to the Internet and be changed after being re-connected to the Internet. In another embodiment, the computing device working as a single host 102 can have a fixed unique IP address. In this context, the host 102 may be viewed as a node of the network.

Also, in a computer environment including a plurality of devices, the host 102 may refer to a single mainframe computer. In this situation, the host 102 may be connected, or attached, to a terminal for data communication. Furthermore, in another embodiment, the host 102 may include a device or a program application that supports an operation or another program application executed in another device which has less computational power than the host 102. In the data processing system, the host 102 may have higher computing power than the memory system 110 and may have more resources that can be used or employed to process a task or an operation.

Referring to FIG. 1, the memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. Although not illustrated, the memory device 150 may include a plurality of memory blocks. The memory block may be understood as a group of non-volatile memory cells in which data is removed together by a single erase operation. The memory block may include a page which is a group of non-volatile memory cells that store data together during a single program operation or output data together during a single read operation. For example, the memory block may include a plurality of pages.

The memory device 150 may store a user data item, which is transmitted from an external device and stored in the memory device 150, and a meta data item associated with the user data item for an internal operation. The meta data item may include mapping information as well as information related to the operational status of the memory device 150. Here, the mapping information includes data connecting a logical address used by an external device and a physical address used in the memory device 150.

In an embodiment, the memory device 150 may include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells.

In addition, according to an embodiment, the memory die may include at least one memory plane. The memory die may be understood as a set of components implemented on a physically distinguishable substrate. Each memory die may be connected to the controller 130 through a data path. Each memory die may include an interface to exchange a piece of data and a signal with the controller 130.

According to an embodiment, the memory device 150 may include at least one memory block, at least one memory plane, or at least one memory die. The internal configuration of the memory device 150 shown in FIG. 1 may be different according to performance of the memory system 110. An embodiment of the disclosure is not limited to the internal configuration shown in FIG. 1.

In an embodiment, the memory device 150 may include a voltage supply circuit capable of supplying at least one voltage into the memory block. The voltage supply circuit may supply a read voltage, a program voltage, a pass voltage, or an erase voltage into a non-volatile memory cell included in the memory block. For example, during a read operation for reading data stored in the non-volatile memory cell included in the memory block, the voltage supply circuit may supply the read voltage into a selected non-volatile memory cell. During the program operation for storing data in the non-volatile memory cell included in the memory block, the voltage supply circuit may supply the program voltage into a selected non-volatile memory cell. Also, during a read operation or a program operation performed on the selected nonvolatile memory cell, the voltage supply circuit may supply a pass voltage into a non-selected non-volatile memory cell. During the erasing operation for erasing data stored in the non-volatile memory cell included in the memory block, the voltage supply circuit may supply the erase voltage into the memory block.

Referring to FIG. 1, the controller 130 may include a host interface 132, a flash translation layer (FTL) 240, a memory interface 142, and a memory 144. The host interface 132 may perform data communication between the controller 130 and the host 102, and the memory interface 142 may perform data communication between the controller 130 and the memory device 150. In order to store data requested by an external device (e.g., the host 102) in the memory device 150 (i.e., a storage space including a non-volatile memory cells), the flash translation layer 240 can perform address translation for linking a file system used by the host 102 and the storage space including the non-volatile memory cells. For example, an address indicating data according to the file system used by the host 102 may be referred to as a logical address or a logical block address, and an address indicating a data location in the storage space including non-volatile memory cells may be referred to as a physical address or a physical block address. When the host 102 transmits a logical address along with a read request to the memory system 110, the memory system 110 searches for a physical address corresponding to the logical address, and then reads data stored in a location identified by the physical address. During these processes, the flash translation layer 240 may perform address translation to search for the physical address corresponding to the logical address input from the host 102. The host interface 132, the flash translation layer (FTL, 240), and the memory interface 142 may use the memory 144 to temporarily store data, results, and the like used or generated during their operations.

When the host 102 is in an active state (ACTIVE) or operates normally, the host 102 in the data processing system 100 can perform an operation corresponding to a user request, and control various devices included in, or connected to, the host 102. For example, the host 102 may request the memory system 110 to store data in the memory system 110 in response to a user's request, and may request the memory system 110 to provide data stored in the memory system 110 to a user.

Meanwhile, when there is no user's request for a preset period of time, the host 102 may enter into an idle state or a power saving mode. Herein, a case when a processor in the host 102 does not perform an operation may be understood as an inactive state (INACTIVE). When the processor in the host 102 is in an inactive state (INACTIVE), various devices including the memory system 110, which interwork with the host 102, may also enter in an inactive mode. However, in the data processing system 100 according to an embodiment of the disclosure, even when the processor in the host 102 is in an inactive state (INACTIVE), the memory system 110 can perform an operation for generating, processing, or transforming data, in response to a host's request.

The host 102 may delegate a task to the memory system 110. Generally, the host 102 may include more resources which can be used or employed to process a task than the resources of the memory system 110 so that the host 102 can have more computing power than the memory system 110. Accordingly, the host 102 may perform a task corresponding to a user's request faster than that of the memory system 110. However, in a case when a task corresponding to a user's request may be achieved with low computational complexity but is required to be performed periodically or regularly, a dissipation of resources in the data processing system 100 may occur when the host 102 is maintained in the active state (ACTIVE) for handling the task. In addition, frequent changes of the operating state of the processor in the host 120 from the active state (ACTIVE) to the inactive state (INACTIVE), or vice versa, may cause overhead in the data processing system 100. Accordingly, the host 102 may delegate some tasks to be executed periodically or regularly to the memory system 110, when the task can be achieved by the memory system 110 having a lower computational power than the host 102. Then, the host 102 can enter, or be maintained, in an inactive state (INACTIVE) because the memory system 110 can independently perform the delegated task on behalf of the host 102.

The memory system 110 may independently perform the delegated task without involvement of a processor in the host 102 and then store an execution result in the memory device 150. Because the memory system 110 independently performs the delegated task while the host 102 is in an inactive state (INACTIVE), the memory system 110 may transmit the execution result, obtained through the independently performed operation, to the host 102 after the processor in the host 102 enters an ACTIVE state, i.e., wakes up. Through this procedure, the data processing system 100 can use resources in the host 102 and the memory system 110 efficiently.

According to an embodiment, the host 102 may transfer a task in a form of an executable file to the memory system 110. For example, the executable file may include a command script where a plurality of executable commands is recorded. A typical example of a command script is a batch file. The host 102 and the memory system 110 may transmit and receive requests, data, etc. according to a protocol (e.g., small computer system interface (SCSI), etc.) established in advance for data input/output operation. The host 102 may encode a task in the executable file which can be transmitted under a protocol for data communication with the memory system 110, and the memory system 110 decodes the encoded task delivered via the executable file. Through these processes, the memory system 110 may recognize a task to be delegated by the host 102.

The memory system 110 may include firmware for decoding requests related to data input/output operations such as read, write, and erase requests input from the host 102 and perform corresponding operations. However, a task delegated by the host 102 is distinct from a general data input/output operation. The memory system 110 may include a list of commands to interpret and execute the delegated task to perform a detailed operation corresponding to the task. In an embodiment, the host 102 may transmit the list of commands required by the memory system 110 or notify a location of the lists of commands stored in the memory system 110 to the memory system 110.

The processor included in the host 102 may perform functions of storing data, calculating data, and controlling other devices. For example, the processor included in the host 102 may perform a function of interpreting instructions of an application program and calculating or processing data based on interpreted instructions. The processor may include a control unit configured to read instructions from software and send signals to other parts of the hardware, an arithmetic logic unit (ALU) configured to perform an arithmetic operation (e.g., calculation), a logical operation, etc., and a register or cache capable of temporarily storing data and signals. Further, according to an embodiment, the processor in the host 102 may include a plurality of cores, each core capable of individually processing or handling various operations. For example, when a processor in the host 102 performs a complex operation, the complex operation may be divided into a plurality of operations which can be processed or handled in parallel by the plurality of cores.

The controller 130 in the memory system 110 may also have a configuration similar to that of the processor included in the host 102. To improve a data storage capacity of the memory device 150 in the memory system 110 and a data input/output speed of the memory system 110, the controller 130 may require more computational power. As the controller 130 can have a configuration similar to that of the processor included in the host 102, a task processed by the processor included in the host 102 can be performed by the controller 130 instead of the processor in the host 102. For example, the controller 130 may include a plurality of cores, and include an arithmetic logic unit (ALU) and a control unit. The controller 130 may use the plurality of cores to perform parallel and distributed data input/output operations requested by the host 102. In addition, in order to improve data safety, the controller 130 encodes and decodes data before outputting the data transmitted from the memory device 150 to the host 102, and before storing the data in the memory device 150. Because the controller 130 also includes a control device, an operation device, a register/cache, etc. which are similar components included in the processor in the host 102, the controller 130 in the memory system 110 can recognize a task performed by the processor in the host 102 and perform the task on behalf of the processor in the host 102.

Figure 2:
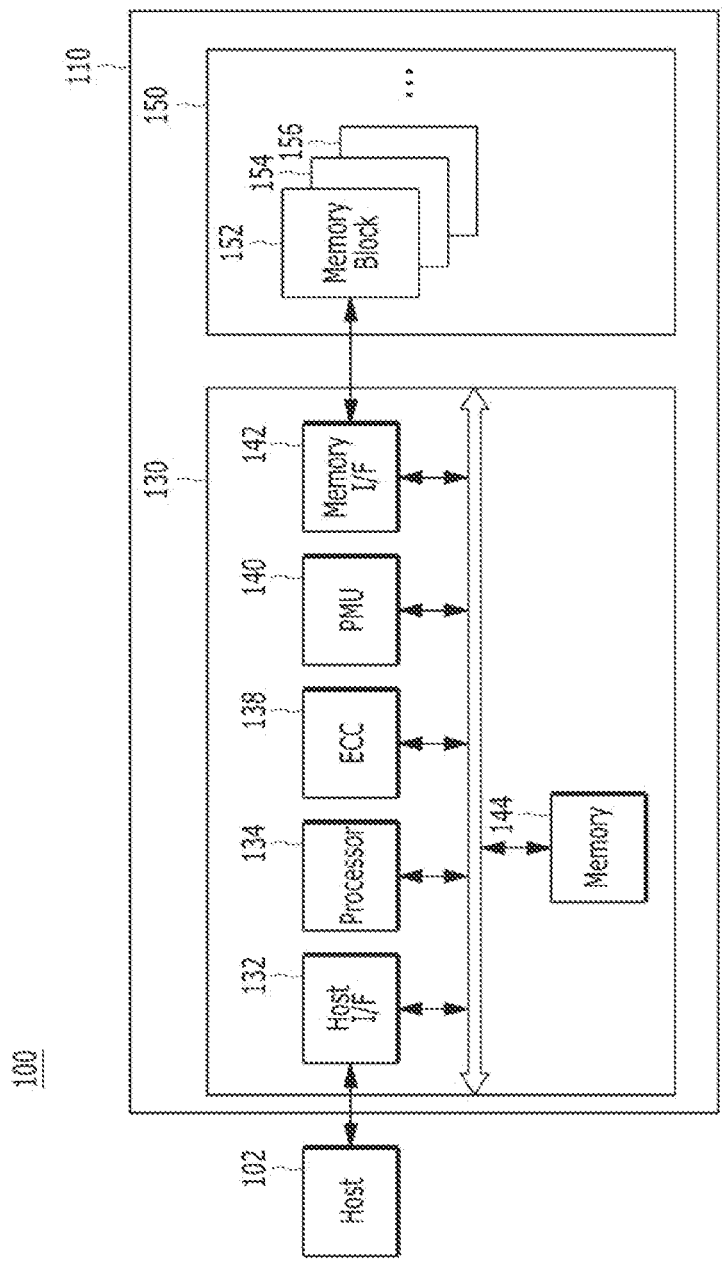
FIG. 2 illustrates a data processing system according to an embodiment of the disclosure.
Figure 3:
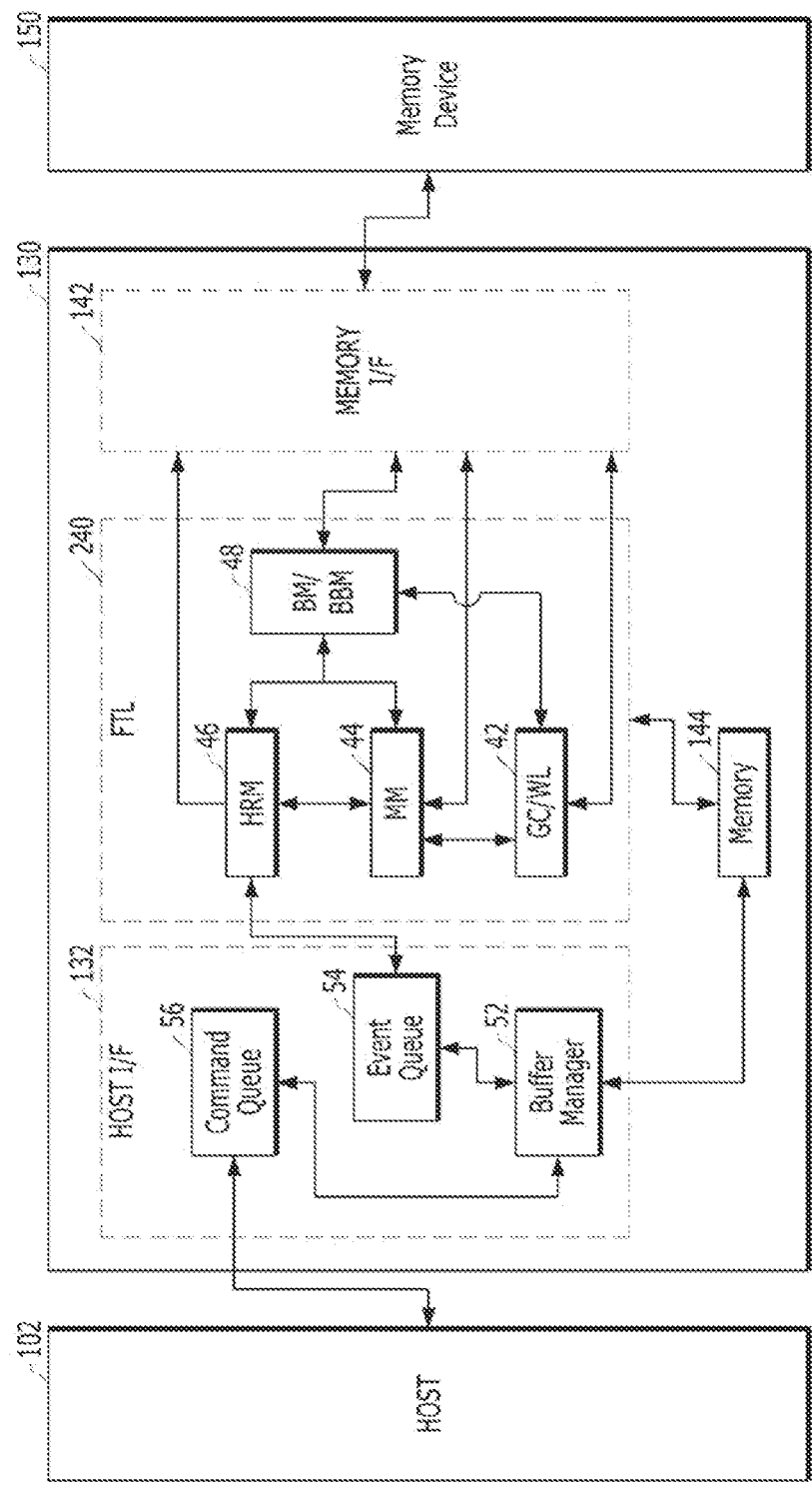
FIG. 3 illustrates a memory system according to an embodiment of the disclosure.
Figure 4:
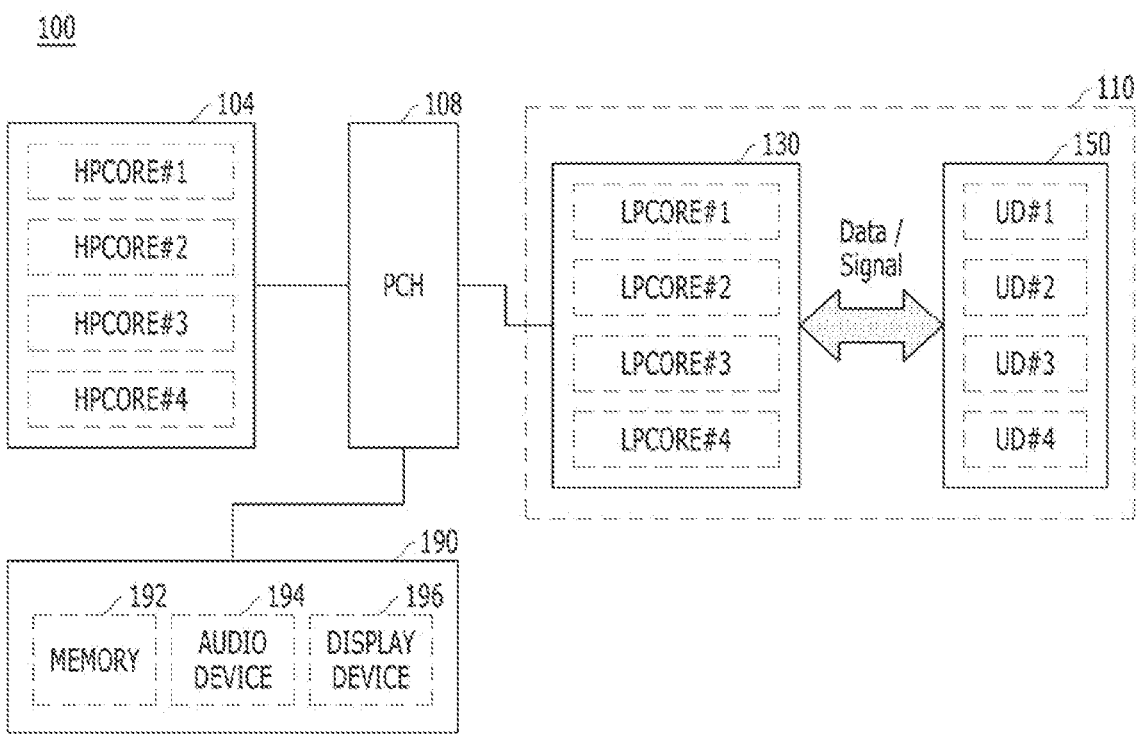
FIG. 4 illustrates a data processing system according to another embodiment of the disclosure.
Figure 5:
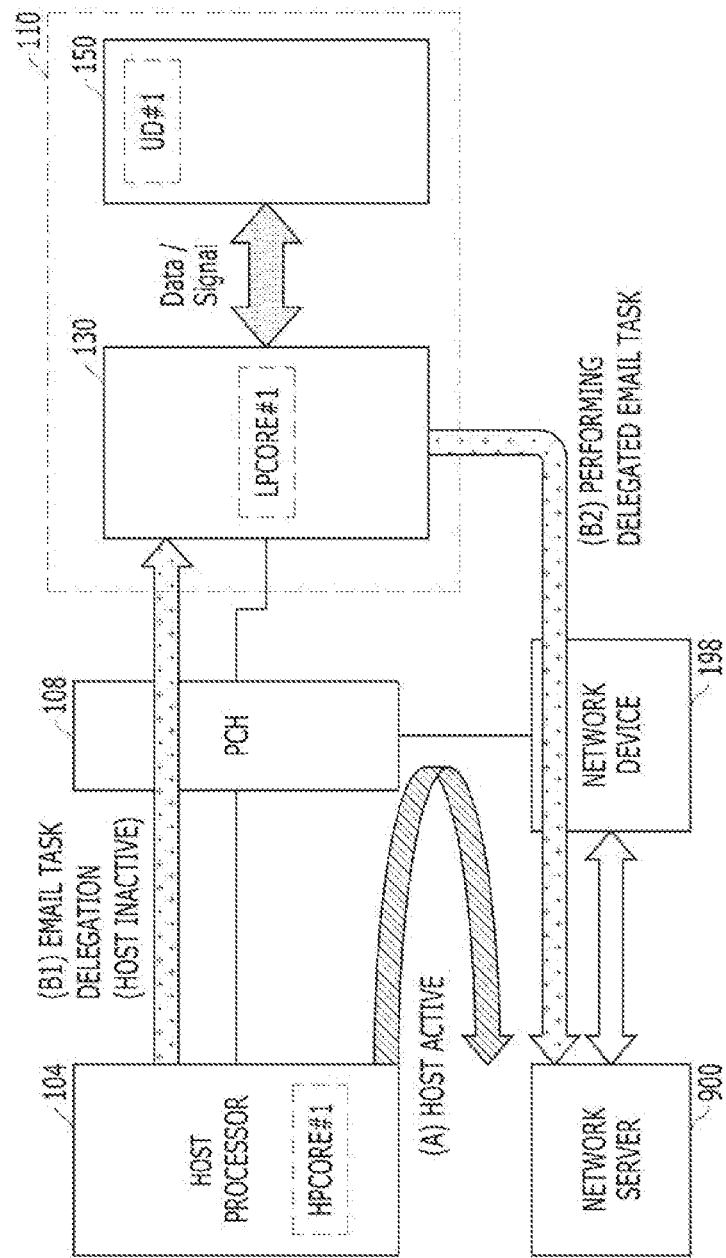
FIG. 5 describes execution of an email program in a data processing system according to another embodiment of the disclosure.

Hereinafter, various embodiments of the data processing system 100 will be described. Specifically, FIGS. 2 to 3 show the memory system 110 which can perform a data input/output operation, e.g., components included in the memory system 110, to increase operation efficiency. In addition, FIGS. 4 to 5 illustrate a data processing system 100 that works depending on an operation state of the host 102.

Referring to FIG. 2, a data processing system 100 in accordance with an embodiment of the disclosure is described. Referring to FIG. 2, the data processing system 100 may include a host 102 engaged with, or operably coupled to, a memory system 110.

The host 102 may include, for example, a portable electronic device such as a mobile phone, an MP3 player and a laptop computer, or a non-portable electronic device such as a desktop computer, a game player, a television (TV), a projector and the like.

The host 102 also includes at least one operating system (OS), which can generally manage and control, functions and operations performed in the host 102. The OS can provide interoperability between the host 102 engaged with the memory system 110 and the user of the memory system 110. The OS may support functions and operations corresponding to a user's requests. By way of example but not limitation, the OS can be classified into a general operating system and a mobile operating system according to mobility of the host 102. The general operating system may be split into a personal operating system and an enterprise operating system according to system requirements or a user's environment. But the enterprise operating systems can be specialized for securing and supporting high performance computing. The mobile operating system may be subject to support services or functions for mobility (e.g., a power saving function). The host 102 may include a plurality of operating systems. The host 102 may execute multiple operating systems coupled with the memory system 110, corresponding to a user's request. The host 102 may transmit a plurality of commands corresponding to the user's requests into the memory system 110, thereby performing operations corresponding to commands within the memory system 110.

The controller 130 in the memory system 110 may control the memory device 150 in response to a request or a command input from the host 102. For example, the controller 130 may perform a read operation to provide a piece of data read from the memory device 150 to the host 102, and perform a write operation (or a program operation) to store a piece of data input from the host 102 in the memory device 150. In order to perform data input/output (I/O) operations, the controller 130 may control and manage internal operations for data read, data program, data erase, or the like.

According to an embodiment, the controller 130 can include a host interface 132, a processor 134, error correction circuitry 138, a power management unit (PMU) 140, a memory interface 142, and a memory 144. Components included in the controller 130 illustrated in FIG. 2 may vary according to implementation, desired operation performance, or other characteristics or considerations of the memory system 110. For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC drive (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. As noted above, one or more components in the controller 130 may be omitted or others added based on implementation of the memory system 110.

The host 102 and the memory system 110 may include a controller or an interface for transmitting and receiving a signal, a piece of data, and the like, under a specific protocol. For example, the host interface 132 in the memory system 110 may include an apparatus capable of transmitting a signal, a piece of data, and the like to the host 102 or receiving a signal, a piece of data, and the like output from the host 102.

The host interface 132 in the controller 130 may receive a signal, a command (or a request), or a piece of data output from the host 102. That is, the host 102 and the memory system 110 may use a set protocol to transmit and receive a piece of data between each other. Examples of protocols or interfaces supported by the host 102 and the memory system 110 for sending and receiving a piece of data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), and the like. According to an embodiment, the host interface 132 is a type of layer for exchanging a piece of data with the host 102 and is implemented with, or driven by, firmware called a host interface layer (HIL).

The Integrated Drive Electronics (IDE) or Advanced Technology Attachment (ATA), which are one of the interfaces for transmitting and receiving a piece of data, can use a cable including 40 wires connected in parallel to support data transmission and reception between the host 102 and the memory system 110. When a plurality of memory systems 110 are connected to a single host 102, the plurality of memory systems 110 may be divided into a master and slaves by using a position or a dip switch to which the plurality of memory systems 110 are connected. The memory system 110 set as the master may be used as the main memory device. The IDE (ATA) has evolved into Fast-ATA, ATAPI, and Enhanced IDE (EIDE).

Serial Advanced Technology Attachment (SATA) is a type of serial data communication interface that is compatible with various ATA standards of parallel data communication interfaces which is used by Integrated Drive Electronics (IDE) devices. The 40 wires in the IDE interface can be reduced to six wires in the SATA interface. For example, 40 parallel signals for the IDE can be converted into 6 serial signals for the SATA to be transmitted between each other. The SATA has been widely used because of its faster data transmission and reception rate and less resource consumption in the host 102 when the SATA is used for data transmission and reception. The SATA may support connection with up to 30 external devices to a single transceiver included in the host 102. In addition, the SATA can support hot plugging that allows an external device to be attached or detached from the host 102 even while data communication between the host 102 and another device is being executed. Thus, the memory system 110 can be connected or disconnected as an additional device, like a device supported by a universal serial bus (USB) even when the host 102 is powered on. For example, in a host 102 having an eSATA port, the memory system 110 may be freely detached like an external hard disk.

The Small Computer System Interface (SCSI) is a type of serial data communication interface used for connection between a computer, a server, and/or another peripheral device. The SCSI can provide a high transmission speed, as compared with other interfaces such as the IDE and the SATA. In the SCSI, the host 102 and at least one peripheral device (e.g., the memory system 110) are connected in series, but data transmission and reception between the host 102 and each peripheral device may be performed through a parallel data communication. In the SCSI, it is easy to connect to, or disconnect from, the host 102 a device such as the memory system 110. The SCSI can support connections of 15 other devices to a single transceiver included in host 102.

The Serial Attached SCSI (SAS) can be understood as a serial data communication version of the SCSI. In the SAS, not only the host 102 and a plurality of peripheral devices are connected in series, but also data transmission and reception between the host 102 and each peripheral device may be performed in a serial data communication scheme. The SAS can support connection between the host 102 and the peripheral device through a serial cable instead of a parallel cable, so as to easily manage equipment using the SAS and enhance or improve operational reliability and communication performance. The SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. Here, the PCIe can use a slot or a specific cable for connecting the host 102, such as a computing device, and the memory system 110, such as a peripheral device. For example, the PCIe can use a plurality of pins (for example, 18 pins, 32 pins, 49 pins, 82 pins, etc.) and at least one wire (e.g. ×1, ×4, ×8, ×16, etc.), to achieve high speed data communication over several hundred MB per second (e.g. 250 MB/s, 500 MB/s, 985 MB/s, 1969 MB/s, and etc.). According to an embodiment, the PCIe scheme may achieve bandwidths of tens to hundreds of Giga bits per second. A system using the NVMe can make the most of an operation speed of the non-volatile memory system 110, such as an SSD, which operates at a higher speed than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and a peripheral device such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of the data to be processed in, and output from, the memory device 150, which may include an error correction code (ECC) encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in data read from the memory device 150 when the controller 130 reads the data stored in the memory device 150. In other words, after performing error correction decoding on the data read from the memory device 150, the error correction circuitry 138 can determine whether the error correction decoding has succeeded and output an instruction signal (e.g., a correction success signal or a correction fail signal). The error correction circuitry 138 can use the parity bit which is generated during the ECC encoding process, for correcting error bit(s) of the read data. When the number of error bits is greater than or equal to a threshold number of correctable error bits, the error correction circuitry 138 might not correct error bits but instead may output an error correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The error correction circuitry 138 may include any and all circuits, modules, systems, and/or devices for performing the error correction operation based on at least one of the above described codes.

For example, the ECC decoder may perform hard decision decoding and/or soft decision decoding to data transmitted from the memory device 150. Here, hard decision decoding can be understood as one of two methods broadly classified for error correction. The hard decision decoding may include an operation of correcting an error by reading digital data of '0' or '1' from a non-volatile memory cell in the memory device 150. Because the hard decision decoding handles a binary logic signal, design and/or configuration of a circuit or algorithm for performing such decoding may be simple and processing speed may be faster than the soft decision decoding.

The soft decision decoding may quantize a threshold voltage of a non-volatile memory cell in the memory device 150 by two or more quantized values (e.g., multiple bit data, approximate values, an analog value, and the like) to correct an error based on the two or more quantized values. The controller 130 can receive two or more quantized values from a plurality of non-volatile memory cells in the memory device 150, and then perform decoding based on information generated by characterizing the quantized values as a combination of information such as conditional probability or likelihood.

According to an embodiment, the ECC decoder may use a low-density parity-check and generator matrix (LDPC-GM) code among methods designed for soft decision decoding. Here, the low-density parity-check (LDPC) code uses an algorithm that can read values of data from the memory device 150 in several bits according to reliability, not simply data of 1 or 0 like hard decision decoding, and iteratively repeats it through message exchange to improve reliability of the values, and then the values are finally determined as data of 1 or 0. For example, a decoding algorithm using LDPC codes can be understood as a probabilistic decoding. In hard decision decoding a value output from a non-volatile memory cell is coded as 0 or 1. Compared to hard decision decoding, soft decision decoding can determine the value stored in the non-volatile memory cell based on the stochastic information. Regarding bit-flipping which may considered an error that can occur in the memory device 150, the soft decision decoding may provide improved probability of correcting an error and recovering data, as well as provide reliability and stability of corrected data. The LDPC-GM code may have a scheme in which internal LDGM codes can be concatenated in series with high-speed LDPC codes.

According to an embodiment, the ECC decoder may use a low-density parity-check conventional convolutional code (LDPC-CC) among methods designed for soft decision decoding. Herein, the LDPC-CC may employ linear time encoding and pipeline decoding based on a variable block length and a shift register.

According to an embodiment, the ECC decoder may use a Log Likelihood Ratio Turbo Code (LLR-TC) among methods designed for soft decision decoding. Herein, the Log Likelihood Ratio (LLR) may be calculated as a non-linear function to obtain a distance between a sampled value and an ideal value. In addition, Turbo Code (TC) may include a simple code (for example, a Hamming code) in two or three dimensions, and repeat decoding in a row direction and a column direction to improve reliability of values.

The power management unit (PMU) 140 may control electrical power provided in the controller 130. The PMU 140 may monitor the electrical power supplied to the memory system 110 (e.g., a voltage supplied to the controller 130) and provide the electrical power to components in the controller 130. The PMU 140 can not only detect power-on or power-off, but also can generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150 to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory. For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 may be implemented through, or driven by, firmware called a Flash Interface Layer (FIL) as a component for exchanging data with the memory device 150.

According to an embodiment, the memory interface 142 may support an open NAND flash interface (ONFi), a toggle mode or the like for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 may be achieved through at least one interface regarding an asynchronous single data rate (SDR), a synchronous double data rate (DDR), and a toggle double data rate (DDR).

The memory 144 may be a working memory in the memory system 110 or the controller 130, storing temporary or transactional data received or delivered for operations in the memory system 110 and the controller 130. For example, the memory 144 may temporarily store a piece of read data output from the memory device 150 in response to a request from the host 102, before the piece of read data is output to the host 102. In addition, the controller 130 may temporarily store a piece of write data input from the host 102 in the memory 144, before programming the piece of write data in the memory device 150. When the controller 130 controls operations such as data read, data write, data program, data erase, etc. of the memory device 150, a piece of data transmitted or generated between the controller 130 and the memory device 150 of the memory system 110 may be stored in the memory 144. In addition to the piece of read data or write data, the memory 144 may store information (e.g., map data, read requests, program requests, etc.) necessary for performing operations for inputting or outputting a piece of data between the host 102 and the memory device 150. According to an embodiment, the memory 144 may include a command queue, a program memory, a data memory, a write buffer/cache, a read buffer/cache, a data buffer/cache, a map buffer/cache, and the like.

In an embodiment, the memory 144 may be implemented with a volatile memory. For example, the memory 144 may be implemented with a static random access memory (SRAM), a dynamic random access memory (DRAM), or both. Although FIGS. 1 and 2 illustrate, for example, the memory 144 disposed within the controller 130, the embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control overall operation of the memory system 110. For example, the processor 134 can control a program operation or a read operation of the memory device 150, in response to a write request or a read request input from the host 102. According to an embodiment, the processor 134 may execute firmware to control the program operation or the read operation in the memory system 110. Herein, the firmware may be referred to as a flash translation layer (FTL). An example of the FTL is later described in detail, referring to FIG. 3. According to an embodiment, the processor 134 may be implemented with a microprocessor or a central processing unit (CPU).

According to an embodiment, the memory system 110 may be implemented with at least one multi-core processor. The multi-core processor is a circuit or chip in which two or more cores, which are considered distinct processing regions, are integrated. For example, when a plurality of cores in the multi-core processor drive or execute a plurality of flash translation layers (FTLs) independently, data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may operate independently of a command or a request input from an external device such as the host 102. Typically, an operation performed by the controller 130 in response to the request or the command input from the host 102 may be considered a foreground operation, while an operation performed by the controller 130 independently (e.g., regardless the request or the command input from the host 102) may be considered a background operation. The controller 130 can perform the foreground or background operation for read, write or program, erase and the like regarding a piece of data in the memory device 150. In addition, a parameter set operation corresponding to a set parameter command or a set feature command as a set command transmitted from the host 102 may be considered a foreground operation. As a background operation without a command transmitted from the host 102, the controller 130 can perform garbage collection (GC), wear leveling (WL), bad block management for identifying and processing bad blocks, or the like, relating to a plurality of memory blocks 152, 154, 156 included in the memory device 150.

According an embodiment, substantially similar operations may be performed as both the foreground operation and the background operation. For example, when the memory system 110 performs garbage collection in response to a request or a command input from the host 102 (e.g., Manual GC), garbage collection can be considered a foreground operation. However, when the memory system 110 performs garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform parallel processing regarding plural requests or commands input from the host 102 to improve performance of the memory system 110. For example, the transmitted requests or commands may be distributed to, and processed in parallel within, a plurality of dies or a plurality of chips in the memory device 150. The memory interface 142 in the controller 130 may be connected to a plurality of dies or chips in the memory device 150 through at least one channel and at least one way. When the controller 130 distributes and stores pieces of data in the plurality of dies through each channel or each way in response to requests or commands associated with a plurality of pages including non-volatile memory cells, plural operations corresponding to the requests or the commands can be performed simultaneously or in parallel. Such a processing method or scheme can be considered as an interleaving method. Because data input/output speed of the memory system 110 operating with the interleaving method may be faster than that without the interleaving method, data I/O performance of the memory system 110 can be improved.

By way of example but not limitation, the controller 130 can recognize the status of each of a plurality of channels (or ways) associated with a plurality of memory dies in the memory device 150. For each channel/way, the controller 130 may determine it to have a busy status, a ready status, an active status, an idle status, a normal status, and/or an abnormal status. The controller's determination of which channel or way an instruction (and/or a data) is delivered through can be associated with a physical block address, e.g., to which die(s) the instruction (and/or the data) is delivered. For such determination, the controller 130 can refer to descriptors delivered from the memory device 150. The descriptors, which are data with a specific format or structure can include a block or page of parameters that describe something about the memory device 150. For instance, the descriptors may include device descriptors, configuration descriptors, unit descriptors, and the like. The controller 130 can refer to, or use, the descriptors to determine via which channel(s) or way(s) an instruction or a data is exchanged.

Referring to FIG. 2, the memory device 150 in the memory system 110 may include the plurality of memory blocks 152, 154, 156, each of which includes a plurality of non-volatile memory cells. According to an embodiment, a memory block can be a group of non-volatile memory cells erased together. Each memory block 152, 154, 156 may include a plurality of pages which is a group of non-volatile memory cells read or programmed together. In an embodiment, each memory block 152, 154, 156 may have a three-dimensional stack structure for a high integration. Further, the memory device 150 may include a plurality of dies, each die including a plurality of planes, each plane including the plurality of memory blocks. Configuration of the memory device 150 may vary depending on performance of the memory system 110. The plurality of memory blocks 152, 154, 156 may be included in the plurality of memory blocks shown in FIG. 1.

The plurality of memory blocks 152, 154, 156 are included in the memory device 150 shown in FIG. 2. The plurality of memory blocks 152, 154, 156 can be any of different types of memory blocks such as a single-level cell (SLC) memory block, a multi-level cell (MLC) memory block, or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated in view of storage capacity. In an embodiment, the memory device 150 may be implemented with MLC memory blocks such as double level cell (DLC) memory blocks, triple-level cell (TLC) memory blocks, quadruple-level cell (QLC) memory blocks or combination thereof. The double-level cell (DLC) memory block may include a plurality of pages implemented by memory cells, each capable of storing 2-bit data. The triple-level cell (TLC) memory block can include a plurality of pages implemented by memory cells, each capable of storing 3-bit data. The quadruple-level cell (QLC) memory block can include a plurality of pages implemented by memory cells, each capable of storing 4-bit data. In another embodiment, the memory device 150 can be implemented with a block including a plurality of pages implemented by memory cells, each capable of storing five or more bits of data.

According to an embodiment, the controller 130 may use a multi-level cell (MLC) memory block in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. The controller 130 can utilize a faster data input/output speed of the multi-level cell (MLC) memory block when using the multi-level cell (MLC) memory block as the SLC memory block. For example, the controller 130 can use the MLC memory block as a buffer to temporarily store a piece of data, because the buffer may require a high data input/output speed for improving performance of the memory system 110.

Further, according to an embodiment, the controller 130 may program pieces of data in a multi-level cell (MLC) a plurality of times without performing an erase operation on a specific MLC memory block in the memory device 150. In general, non-volatile memory cells have a feature that does not support data overwrite. However, the controller 130 may use a feature in which a multi-level cell (MLC) may store multi-bit data, in order to program plural pieces of 1-bit data in the MLC a plurality of times. For MLC overwrite operation, the controller 130 may store the number of program times as separate operation information when a piece of 1-bit data is programmed in a non-volatile memory cell. According to an embodiment, an operation for uniformly levelling threshold voltages of non-volatile memory cells can be carried out before another piece of data is overwritten in the same non-volatile memory cells.

In an embodiment of the disclosure, the memory device 150 is embodied as a non-volatile memory such as a flash memory, for example, as a NAND flash memory, a NOR flash memory, and the like. Alternatively, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Referring to FIG. 3, a controller 130 in a memory system in accordance with another embodiment of the disclosure is described. The controller 130 cooperates with the host 102 and the memory device 150. As illustrated, the controller 130 includes a flash translation layer (FTL) 240, as well as the host interface 132, the memory interface 142, and the memory 144 of FIG. 2.

In an embodiment, in accordance with an embodiment, the ECC 138 illustrated in FIG. 2 may be included in the flash translation layer (FTL) 240. In another embodiment, the ECC 138 may be implemented as a separate module, a circuit, firmware, or the like, which is included in, or associated with, the controller 130.

The host interface 132 is for handling commands, data, and the like transmitted from the host 102. By way of example but not limitation, the host interface 132 may include a command queue 56, a buffer manager 52, and an event queue 54. The command queue 56 may sequentially store commands, data, and the like received from the host 102 and output them to the buffer manager 52 in an order in which they are stored. The buffer manager 52 may classify, manage, or adjust the commands, the data, and the like, which are received from the command queue 56. The event queue 54 may sequentially transmit events for processing the commands, the data, and the like received from the buffer manager 52.

A plurality of commands or data of the same type, e.g., read or write commands, may be transmitted from the host 102, or commands and data of different types may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what kind of internal operation the controller 130 will perform according to the types of commands, data, and the like, which have been received from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) 240. The event queue 54 receives events, received from the buffer manager 52, which are to be internally executed and processed by the memory system 110 or the controller 130 in response to the commands, the data, and the like transmitted from the host 102, so as to deliver the events into the flash translation layer (FTL) 240 in the order received.

In accordance with an embodiment, the flash translation layer (FTL) 240 illustrated in FIG. 3 may work as a multi-thread scheme to perform the data input/output (I/O) operations. A multi-thread FTL may be implemented through a multi-core processor using multi-thread included in the controller 130.

In accordance with an embodiment, the flash translation layer (FTL) 240 can include a host request manager (HRM) 46, a map manager (MM) 44, a state manager 42, and a block manager 48. The host request manager (HRM) 46 can manage the events entered from the event queue 54. The map manager (MM) 44 can handle or control a map data. The state manager 42 can perform garbage collection (GC) or wear leveling (WL). The block manager 48 can execute commands or instructions on a block in the memory device 150. Although not illustrated in FIG. 3, according to an embodiment, the error correction circuitry 138 described in FIGS. 1 and 2 may be included in the flash translation layer (FTL) 240. According to an embodiment, the error correction circuitry 138 may be implemented as a separate module, circuit, or firmware in the controller 130.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map manager (MM) 44 to determine a physical address corresponding to the logical address associated with the events. The host request manager (HRM) 46 can send a read request with the physical address to the memory interface 142, to process the read request (handle the events). On the other hand, the host request manager (HRM) 46 can send a program request (write request) to the block manager 48, to program data to a specific empty page (no data) in the memory device 150, and then, can transmit a map update request corresponding to the program request to the map manager (MM) 44 to update an item relevant to the programmed data in information for associating, or mapping, the logical-physical addresses with, or to, each other.

Here, the block manager 48 can convert a program request delivered from the host request manager (HRM) 46, the map manager (MM) 44, and/or the state manager 42 to a flash program request used for the memory device 150 to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks from which the valid data was moved so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not properly completed, the map manager 44 might not perform the mapping table update. It is because the map request is issued with old physical information if the status manger 42 requests a map update and a valid page copy is completed later. The map manager 44 may perform a map update operation to ensure accuracy only if the latest map table still points to the old physical address.

FIG. 4 illustrates a data processing system according to another embodiment of the disclosure.

Referring to FIG. 4, the data processing system 100 may include a host processor 104, a platform controller hub (PCH) 108, a memory system 110, and a peripheral device 190.

The host processor 104 may include a plurality of high-performance cores HPCORE #1 to HPCORE #4. The plurality of high-performance cores HPCORE #1 to HPCORE #4 included in the host processor 104 have higher computational processing power and higher performance than a plurality of low-performance cores LPCORE #1 to LPCORE #4 included in the controller 130. The plurality of high-performance cores HPCORE #1 to HPCORE #4 can have a faster operation speed than the plurality of low-performance cores LPCORE #1 to LPCORE #4. Herein, the high-performance cores and the low-performance cores have relative merits for comparing the host processor 104 with the controller 130 and that does not mean that absolute or objective performance is high or low. In addition, the number of cores individually included in the host processor 104 and the controller 130 may be different according to an embodiment. The number of cores included in the host processor 104 and the controller 130 may be the same or different. For example, the number of high-performance cores HPCORE #1 to HPCORE #4 may be greater than the number of low-performance cores LPCORE #1 to LPCORE #4, and vice versa.

The plurality of low-performance cores LPCORE #1 to LPCORE #4 included in the controller 130 can transfer user data item UD #1 to 15 UD #4 to the memory device 150 in response to a program request of the host processor 104. The user data item UD #1 to UD #4 stored in the memory device 150 may be accessed or transmitted to the host processor 104, in response to a read request of the host processor 104.

The platform controller hub (PCH) 108 may serve as an interface between the host processor 104 and plural components included in the data processing system 100. For example, the platform controller hub (PCH) 108 can enable the host processor 104 to interwork with the memory system 110 as well as the peripheral device 190. The peripheral device 190 may include a volatile memory device 192, an audio device 194, a display device 196, and the like. For example, the volatile memory device 192 may include a plurality of chips or a plurality of banks. The volatile memory device 192 may include a memory controller (e.g., a DRAM controller) that controls input/output of data. The platform controller hub (PCH) 108 connected to the memory controller may transmit a request or a command from the host processor 104 to the memory controller. In an embodiment, the peripheral device 190 may also include a device for network or Internet data communication. Although FIG. 4 illustrates the peripheral including the memory 192, the audio device 194, and the display device 196, the components of the peripheral device 190 may vary depending on design.

Depending on the embodiment, the platform controller hub (PCH) 108 may serve as a bridge or a controller as an interface between the host processor 104 and various devices or components. To this end, the platform controller hub (PCH) 108 can support various protocols. For example, the platform controller hub (PCH, 108) may be designed to support PCI, PCI Express, Serial ATA (SATA), Integrated Drive Electronics (IDE), Universal Serial BUS (USB), General Purpose I/O (GPIO), System Management Bus, etc. It can be designed to support (SMBus 2.0), Serial Peripheral Interface (SPI), Low Pin Count Interface (LPC), JTAG Boundary Scan, etc.

FIG. 5 illustrates execution of an email program in a data processing system according to another embodiment of the disclosure. Specifically, FIG. 5 describes a comparison of a case where the host processor 104 processes a user's request in an active state (A) and another case where a task is delegated from the host processor 104 to the memory system 110 (B1, B2). In FIG. 5, the host processor 104 performs a task of receiving an E-mail from a network server 900, based on a request of a user. Here, an e-mail reception is provided as an example of a task that needs to be performed periodically or regularly although having a low computational complexity. However, the disclosure may not be limited to the e-mail reception.

Referring to FIG. 5, the platform controller hub (PCH) 108 is connected to the network device 198, and the network device 198 may be a type of component included in the peripheral device 190 described in FIG. 4.

The host processor 104 may enable a device or execute an application program capable of receiving an email according to user's request. For example, in the active state (Host Active), the first high-spec core (HPCORE #1) in the host processor 104 may perform a task for receiving an email (A). While the host processor 104 performs a plurality of tasks in addition to receiving an email according to user's requests, the host processor 104 may maintain an activated state. When the first high specification core (HPCORE #1) in the host processor 104 performs a task for receiving an e-mail, an e-mail (i.e., data) is transmitted from the network server 900 through the network device 198. The first high specification core (HPCORE #1) may store the email delivered through the network device 198 in the memory system 110.

On the other hand, the number of user's requests is reduced so that there are no more tasks left to be processed by the host processor 104 other than a periodic email reception. In this situation, maintaining the host processor 104 in an active state may reduce efficiency of resources, because the host processor 104 may work or operate on a basis of large resources but the periodic email reception might not need large resources. The host processor 104 may delegate a task related to the periodic e-mail reception to the memory system 110 (B1). The host processor 104 can generate data having a preset format such as an executable file and then deliver the data into the memory system 110 throughout the platform controller hub (PCH, 108) so that the controller 130 in the memory system 110 can perform a task for periodic e-mail reception independently. At this time, the host processor 104 can hand over a control authority for a part of the platform controller hub (PCH, 108) to the controller 130 so that the controller 130 can perform the task for receiving an e-mail. After the host processor 104 delegates the task for receiving an email to the controller 130, the host processor 104 may enter into the inactive state (HOST INACTIVE) and notify the memory system 110 of the operation state change.

When the host processor 104 is notified that it is in an inactive state (HOST INACTIVE), the controller 130 in the memory system 110 may perform a task delegated from the host processor 104 (B2). For example, the first low-performance core LPCORE #1 in the controller 130 may receive an email (data) corresponding to a user's request from the network server 900 and store the email in the memory device 150. The controller 130 may receive a control authority for the part of the platform controller hub (PCH) 108 from the host processor 104 to control the network device 198. The controller 130 may store the e-mail transmitted through the network device 198 as the first user data item UD #1 in the memory device 150.

In an embodiment, when the host processor 104 wakes up in an inactive state (HOST INACTIVE), the task delegated to the controller 130 may be withdrawn. The controller 130 may stop performing the delegated task and notify the host processor 104 of an execution result of the delegated task. For example, if the host processor 104 is in an inactive state (HOST INACTIVE) for a week and then wakes up, the host processor may perform an email reception task, corresponding to user's request, to obtain emails stored in the network server 900 for a week, and then transmit information about new emails for a week to the user in a conventional data processing system. In addition, if the host processor should perform tasks with a higher priority than the email reception task, notifying information regarding the new emails for a week to the user may be delayed.

However, the host processor 104 and the memory system 110 according to an embodiment of the disclosure can provide new emails for a week, which have been stored in the memory device 150, to a user after the host processor 104 wakes up. Through the above-described procedure, not only can operation efficiency of the host processor 104 and the memory system 110 be improved, but also workloads directly after the host processor 104 wakes up can be reduced. The data processing system 100 can have the advantage of being able to process an operation for satisfying the user's requests faster.

Figure 6:
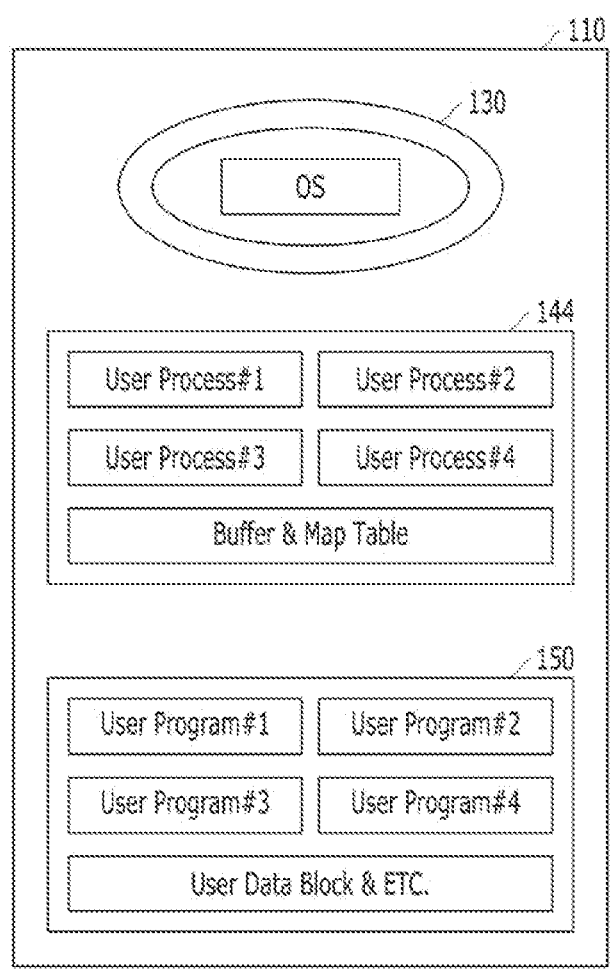
FIG. 6 illustrates a configuration of a memory system according to another embodiment of the disclosure.

FIG. 6 illustrates a configuration of a memory system according to another embodiment of the disclosure. Referring to FIGS. 1 to 3, the memory system 110 may include the controller 130, the memory 144, and the memory device 150.

Referring to FIG. 6, an internal configuration of the memory system 110 performing a task delegated from the host processor 104 will be described in a view of data structure. The controller 130 may include an operating system (OS) for performing a task delegated by the host processor 104 (see FIG. 5). For example, the OS may be installed and stored in the memory device 150, and the controller 130 may load the OS from the memory device 150. Because the controller 130 may have lower computing power than the host processor 104, it may be difficult for the controller 130 to load or execute all of the operating system (OS) or application programs operated by the host processor 104. The operating system (OS) included in the controller 130 may be a customized OS designed to perform a task entrusted by the host processor 104. Depending on an embodiment, the customized OS may be dynamically configured by the host processor 104. In addition, according to an embodiment, the customized operating system may be formed of some among a plurality of modules included in the operating system operated by the host processor 104.

The controller 130 can store at least one User Process #1 to User Process #4 in the memory 144, and then perform at least one process (User Process #1 to User Process #4) sequentially or in response to a preset order. Herein, a process can be understood as a list of tasks listed to perform a specific purpose. The list of the tasks can be understood to be operations which are initiated by application programs User Program #1 to User Program #4. For example, the application programs User Program #1 to User Program #4 stored or installed in the memory device 150 include a process of performing a task coded by or written in a programming language. For example, a source code written by a designer or programmer and a binary file compiled and translated into machine language can be understood as a task or a work process included in the list. For another example, if the work process stored in the memory device 150 is a file, which can be understood to be a program. When the program is loaded in the memory 144 and it is being executed or scheduled to be executed, that may be referred to as a process. Thus, the user process User Process #1 to User Process #4 can be understood to be application programs User Program #1 to User Program #4 loaded into the memory 144 from the memory device 150 to be executed by the controller 130.

After performing the delegated task, the controller 130 may store the execution result in the memory device 150. To this end, the memory 144 may include a buffer in which a data item, a map data segment used for address translation, and the like may be temporarily stored. In addition, the memory device 150 may include a memory block (User Data Block) in which the data item is stored.

Figure 7:
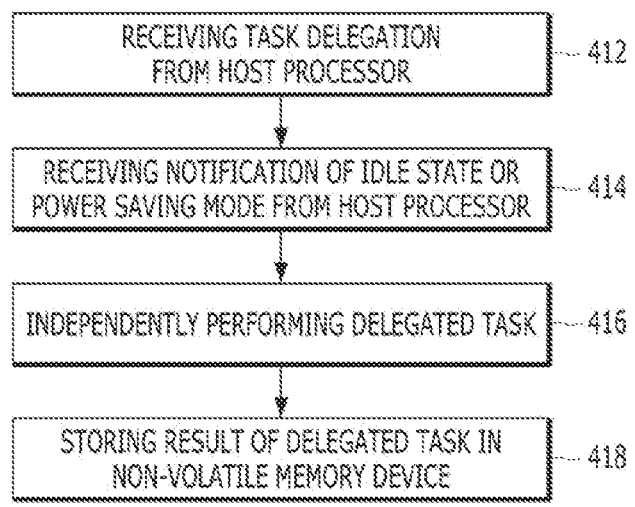
FIG. 7 illustrates a first example of a method for operating a memory system according to an embodiment of the disclosure.

FIG. 7 illustrates a first example of a method for operating a memory system according to an embodiment of the disclosure.

Referring to FIG. 7, a method of operating a memory system includes receiving a task delegation from a host processor (412), receiving a notification of an idle state or a sleep mode (power saving mode) from the host processor (414), independently performing a delegated task (416), and storing a result of the delegated task in a non-volatile memory device (418). Herein, the idle state or the sleep mode (the power saving mode) may be understood as a type of inactive state (INACTIVE).

The host processor 104 (see FIGS. 4 to 5) may delegate at least some of the tasks processed by the host processor 104 to the memory system 110 (see FIGS. 1 to 5), and the memory system 110 can receive the at least some of the tasks delegated from the host processor 104. According to an embodiment, the delegated task may be delivered in a format of executable file. Further, the memory system 110 may perform a procedure to check whether the task can be delegated, and the host processor 104 may perform a procedure to check whether the task can be delegable.

According to an embodiment, the host processor 104 may select and transmit a task, which can be delegated, to the memory system 110 before entering in the inactive state (INACTIVE). However, when a process in the host processor 104 is delayed because there are too many tasks to be performed regardless of the entry of the inactive state (INACTIVE) but there are not many input/output operations of data through the memory system 110, the host processor 104 may delegate at least some of the processed tasks to efficiently use resources in the memory system 110.

The host processor 104 sends a notification of the idle state or the power saving mode to the memory system 110, and the memory system 110 may recognize that the host processor 104 is in the inactive state (414). The information regarding the inactive state input from the host processor 104 may be distinguished from a command (e.g., a hibernation) that the host processor 104 uses to request the memory system 110 to enter the power saving mode. When the host processor 104 requests the memory system 110 to enter the power saving mode, the memory system 110 may enter the power saving mode, and it is difficult for the memory system 110 to perform the task delegated from the host processor 104. When the host processor 104 delegates some tasks to the memory system 110, the host processor 104 may inform the memory system 110 of its operation state, which is not a request or a command for changing the operation mode of the memory system 110. The notification may prevent both the host processor 104 and the memory system 110 from performing the same tasks, which causes unnecessary overhead.

After recognizing that the host processor 104 is in an inactive state (414), the memory system 110 may independently perform the delegated task (416). Herein, the performing the delegated task independently (416) may mean that the memory system 110 can control, perform, or process a corresponding task without the help or assist of the host processor 104. To this end, the host processor 104 may transfer control authority of another device, which is associated with a delegated task, to the memory system 110.

After performing the delegated task (416), the memory system 110 may store the execution result in the non-volatile memory device 150 (refer to FIGS. 1 to 5). The memory system 110 may transmit the execution result stored in the nonvolatile memory device 150 to the host processor 104 later. According to an embodiment, the execution result may include a user data item stored in the memory device 150 and a metadata record (e.g., a log, an event, etc.) generated through a process of performing the delegated task. This metadata record can enable the host processor 104 to review the task performed independently by the memory system 110 later, so that the host processor 104 can easily determine whether the task corresponding to user's request has been performed normally.

Figure 8:
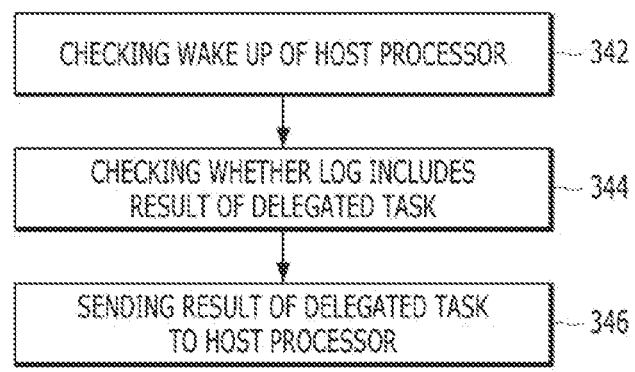
FIG. 8 describes a second example of a method for operating a memory system according to an embodiment of the disclosure.

FIG. 8 illustrates a second example of a method for operating a memory system according to an embodiment of the disclosure.

Referring to FIG. 8, the operation method of the memory system includes checking a wake-up of the host processor (342), checking whether a log includes a result of performing a delegated task (344), and notifying a result of performing the delegated task to the host processor (346).

The host processor 104 (refer to FIGS. 4 to 5) may exit the inactive state (INACTIVE) by user's request or a preset mechanism. Typically, the wake-up may mean that a certain operation or task is completed or terminated and the host processor 104 enters a ready state to perform or schedule a next operation. According to an embodiment, the wake up can be understood as an operation state of the host processor 104 terminating the inactive state and entering a ready state (e.g., an active state) where the host processor 104 can perform a task or an operation in response to a user's request. After the host processor 104 wakes up, a notification indicating that the host processor 104 is ready to perform an operation may be sent to the memory system 110. The memory system 110 may check the state transmitted by the host processor 104 (342).

After recognizing that the host processor 104 has exited or escaped from the inactive state (342), the memory system 110 may review the execution result or the log stored in the memory device 150 (344). While the memory system 110 independently performs a task delegated from the host processor 104, the memory system 110 may have stored the execution result and the log in the memory device 150. After recognizing that the host processor 104 wakes up, the memory system 110 can review the log stored in the memory device 150. If there is no execution result regarding the delegated task, the memory system 110 might not have to transmit information regarding the delegated task to the host processor 104. However, when it is determined that there is an execution result of the task that the memory system 110 has independently performed, the memory device 150 may notify the host processor 104 of the information regarding the delegated task (346). According to an embodiment, when the host processor 104 transmits a request or query related to the delegated task, the memory system 110 may review the execution result of the delegated task in response to the request or query. In addition, after the host processor 104 wakes up, data communication between the memory system 110 and the host processor 104 may be performed based on a preset order or a routine.

Figure 9:
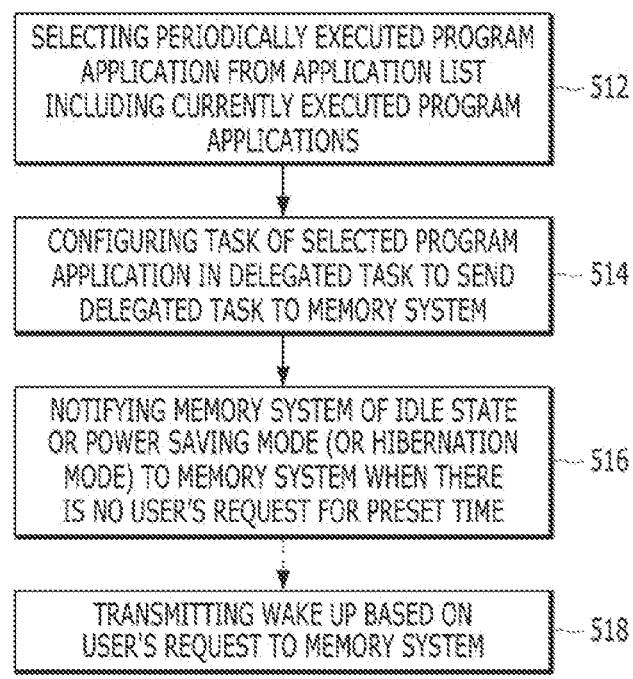
FIG. 9 illustrates a method for operating a host processor according to an embodiment of the disclosure.

FIG. 9 illustrates a method for operating a host processor according to an embodiment of the disclosure.

Referring to FIG. 9, the method for operating the host processor includes selecting a periodically executed program application from an application list including currently executed program applications (512), configuring at least some task of a selected program application in a delegated task to send the delegated task to a memory system (514), and notifying the memory system of an idle state or a power saving mode (or hibernation mode) to the memory system when there is no user's request for a preset time (516).

The host processor 104 (refer to FIGS. 4 to 5) may check a list of application programs being executed (512). The host processor 104 may check the list and select an application program corresponding to a task that can be delegable to the memory system 110 (see FIGS. 1 to 5) (512). The controller 130 (refer to FIGS. 1 to 5) in the memory system 110 may not have greater performance than the host processor 104. Thus, it might be not desirable that an application program including a complex operation executed by the host processor 104 is delegated to the memory system 110. Accordingly, the host processor 104 can determine whether to delegate at least one application program or at least one task to the memory system 110 when the at least one application program or the at least one task suitable for delegating to the memory system 110 is running. For example, the host processor 104 may select an application program periodically executed with low computational complexity to delegate a selected task to the memory system 110, in order to increase efficiency of resources.

After selecting an application program that can be delegated to the memory system 110 (512), the host processor 104 may configure an operation corresponding to the selected program as a task (514). The host processor 104 may delegate the configured tasks to the memory system 110. According to an embodiment, the tasks may be organized in the form of executable files. In addition, the task transmitted to the memory system 110 may have a form suitable for a protocol for data communication between the host processor 104 and the memory system 110.

The host processor 104 may consider entering an inactive state when there is no user's request during a preset time. When the host processor 104 determines to enter the inactive state, it may notify the memory system 110 of the entry into the inactive state (516). Here, the inactive state may include a state such as an idle state or a power saving mode (or hibernation mode). Referring to FIG. 7, after the host processor 104 enters the inactive state, the memory system 110 may perform the delegated task independently.

The method for operating the host processor may further include transmitting a wake up based on user's request to the memory system (518). When the host processor 104 exits the inactive state, it may notify the memory system 110. After the host processor 104 escapes or exits the inactive state and becomes ready to execute an application program in response to user's request, the memory system 110 may not need to perform the delegated task independently. According to an embodiment, the memory system 110 may transmit a result of the delegated task, independently performed while the host processor 104 is in an inactive state, to the host processor 104. In another example, the host processor 104 may request or inquiry a result of the delegated task to the memory system 110. In response to a request or an inquiry of the host processor 104, the memory system 110 can transmit the result of the delegated task independently performed.

An apparatus and an operating method according to an embodiment of the disclosure can reduce power consumption and costs for maintaining performance of a data processing system.

An embodiment of the disclosure can improve operation efficiency and performance of the data processing system and the memory system.

While the present teachings have been illustrated and described with respect to specific embodiments, it will be apparent to those skilled in the art in light of the present disclosure that various changes and modifications may be made without departing from the spirit and scope of the invention as defined in the following claims.

What is claimed is:

1. A memory system, comprising:
   a non-volatile memory device storing data; and
   a controller configured to receive a request for an input/output operation regarding the data from a host processor to perform the input/output operation,
   wherein, after receiving a delegated task which is distinguished from the input/output operation, the controller is further configured to perform the delegated task independently and store a result of the delegated task in the non-volatile memory device, and
   wherein the controller is further configured to receive a notification regarding an idle state, a power saving mode, or a hibernation mode from the host processor before independently performing the delegated task.

2. The memory system according to claim 1,
   wherein the delegated task includes an executable program code and data required to execute the executable program code, and
   wherein the controller is configured to perform the delegated task independently without any assistance from the host processor and store the result of executing the delegated task in the non-volatile memory device.

3. The memory system according to claim 2, wherein the controller is further configured to receive the delegated task delivered in a form of executable batch file.

4. The memory system according to claim 3,
   wherein the controller performs the delegated task by fetching at least one command included in the delegated task, decoding the at least one fetched command, and
   wherein the controller stores the result of executing the at least one fetched command.

5. The memory system according to claim 4, wherein the controller is further configured to receive a command list used for decoding the at least one command, from the host processor.

6. A memory system, comprising:
   a non-volatile memory device storing data; and
   a controller configured to receive a request for an input/output operation regarding the data from a host processor to perform the input/output operation,
   wherein, after receiving a delegated task which is distinguished from the input/output operation, the controller is further configured to perform the delegated task independently and store a result of the delegated task in the non-volatile memory device, and wherein the controller is further configured to receive control authority of a platform controller hub (PCH) from the host processor in order to perform the delegated task.

7. A memory system, comprising:

a non-volatile memory device storing data; and a controller configured to receive a request for an input/output operation regarding the data from a host processor to perform the input/output operation, wherein, after receiving a delegated task which is distinguished from the input/output operation, the controller is further configured to perform the delegated task independently and store a result of the delegated task in the non-volatile memory device, wherein the data stored in the non-volatile memory device includes a user data item and a meta data item, and wherein the delegated task includes a process for adjusting or generating the user data item or storing the user data item input from an external device.

8. A method for operating a memory system, comprising:

receiving a delegated task from a host processor;

receiving a notification of an idle state or a power saving mode from the host processor;

performing a delegated task independently; and storing a result of the delegated task in a non-volatile memory device, wherein the method further comprises:

checking whether the host processor wakes up;

checking whether a log includes information regarding the result of the delegated task; and transmitting the result of the delegated task to the host processor when the log includes the information.

9. The method according to claim 8, wherein the delegated task includes an executable program code and data required to execute the executable program code, wherein the delegated task is independently performed without any assistance from the host processor and wherein the storing includes storing the result of executing the delegated task in the non-volatile memory device.

10. The method according to claim 9, wherein the delegated task is in a form of executable batch file.

11. The method according to claim 10, wherein the performing the delegated task independently includes:

fetching at least one command included in the delegated task; and decoding the at least one fetched command.

12. The method according to claim 11, further comprising receiving a command list from the host processor, the command list used for decoding the at least one command.

13. The method according to claim 8, further comprising:

receiving control authority of a platform controller hub (PCH) from the host processor; and transmitting a request corresponding to the delegated task to the platform controller hub.

14. The method according to claim 8, wherein the data stored in the non-volatile memory device includes a user data item and a meta data item, and wherein the delegated task includes a process for adjusting or generating the user data item or storing the user data item input from an external device.

15. A method for operating a host processor coupled to a memory system including a non-volatile memory device and a controller to handle a user's request, comprising:

selecting an application program periodically executed among a list of currently executed application programs;

configuring the application program periodically executed as a task to delegate the task to the memory system; and transmitting the task to the memory system, wherein the method further comprises:

checking whether there is no user's request for a preset time; and notifying the memory system of an idle state, power saving mode, or hibernation mode based on a result of the checking, after transmitting the task to the memory system.

16. The method according to claim 15, further comprising generating the delegated task in a form of executable batch file, the delegated task including an executable program code and data required to execute the executable program code.

17. The method according to claim 16, further comprising transmitting a command list from the host processor, the command list used for decoding at least one command included in the delegated task.

18. An operating method of a data processing system, the operating method comprising:

configuring, by a host, a task from a program to be executed by the host;

delegating, by the host, the task to a controller, wherein the delegated task is generated in a form of executable batch file, the delegated task including an executable program code and data required to execute the executable program code;

independently executing, by the controller, the delegated task to store one or more results of the executed task in a nonvolatile memory device; and providing, by the controller, the results to the host, wherein the controller executes the delegated task by loading, onto an operating memory included in the controller, an operating system and one or more user programs that are installed in the nonvolatile memory device.

* * * * *